(12) United States Patent
Hunter

(10) Patent No.: US 10,846,743 B2
(45) Date of Patent: Nov. 24, 2020

(54) DISPLAYING CONTENT ITEMS BASED ON USER'S LEVEL OF INTEREST IN OBTAINING CONTENT

(71) Applicant: Google Inc., Mountain View, CA (US)

(72) Inventor: Robin Vincent Hunter, New York, NY (US)

(73) Assignee: Google LLC, Mountain View, CA (US)

( * ) Notice: Subject to any disclaimer, the term of this patent is extended or adjusted under 35 U.S.C. 154(b) by 652 days.

(21) Appl. No.: 14/826,752

(22) Filed: Aug. 14, 2015

(65) Prior Publication Data

US 2017/0046741 A1 Feb. 16, 2017

(51) Int. Cl.
*G06Q 30/02* (2012.01)
*G06Q 30/06* (2012.01)

(52) U.S. Cl.
CPC ..... *G06Q 30/0257* (2013.01); *G06Q 30/0217* (2013.01); *G06Q 30/0275* (2013.01); *G06Q 30/0631* (2013.01)

(58) Field of Classification Search
USPC .......................................................... 705/14
See application file for complete search history.

(56) References Cited

U.S. PATENT DOCUMENTS

| 7,982,620 | B2 | 7/2011 | Prokhorov |
| 8,621,046 | B2 | 12/2013 | Hussain |
| 8,719,363 | B2 | 5/2014 | Cyster |
| 9,785,974 | B1* | 10/2017 | Periasamy ......... G06Q 30/0267 |
| 2002/0023002 | A1 | 2/2002 | Staehelin |
| 2006/0167747 | A1 | 7/2006 | Goodman |
| 2011/0246296 | A1* | 10/2011 | Howard ................. G06Q 30/02 705/14.53 |
| 2011/0251886 | A1* | 10/2011 | Biggs ................ G06Q 30/0246 705/14.42 |
| 2012/0078684 | A1 | 3/2012 | MacIocci et al. |
| 2013/0091580 | A1 | 4/2013 | Maha et al. |

(Continued)

FOREIGN PATENT DOCUMENTS

| JP | 2001-216174 A | 8/2001 |
| JP | 2011-164749 A | 8/2011 |

(Continued)

OTHER PUBLICATIONS

"How online ads got personal" Bashford, Suzy. Revolution, suppl. Digital Marketing Manual 2007: 68-70. Haymarket Business Publications Ltd. (2007) (Year: 2007).*

(Continued)

*Primary Examiner* — Gautam Ubale
(74) *Attorney, Agent, or Firm* — Foley & Lardner LLP

(57) ABSTRACT

Methods, systems, and apparatus, including computer programs encoded on a computer storage medium, for presenting content items. In one aspect, a method includes obtaining, for each of one or more first applications, a user's level of interest in obtaining content based on a number of user requests for content from the application that result in less than a given amount of content being presented to the user. Based on one or more obtained levels of interest, a content item for a second application that has available content is selected. The second application can be different from the first application. The content item is displayed on a display of a user device.

18 Claims, 5 Drawing Sheets

(56) References Cited

U.S. PATENT DOCUMENTS

| | | | | |
|---|---|---|---|---|
| 2013/0178195 A1* | 7/2013 | Luna | ................ | H04W 24/04 455/414.1 |
| 2014/0035771 A1 | 2/2014 | Tsai et al. | | |
| 2014/0096152 A1 | 4/2014 | Ferens et al. | | |
| 2014/0365962 A1* | 12/2014 | Lee | ................ | G06F 9/542 715/810 |
| 2015/0081449 A1* | 3/2015 | Ge | ................ | G06F 17/30867 705/14.66 |
| 2015/0193546 A1* | 7/2015 | Lipton | ................ | G06F 9/445 717/178 |
| 2015/0348135 A1* | 12/2015 | Krishnamurthy | .. | G06Q 30/0275 705/14.71 |
| 2015/0356570 A1* | 12/2015 | Goldsmid | ........ | G06Q 30/0269 705/7.29 |
| 2016/0029176 A1* | 1/2016 | Marti | ................ | H04W 4/028 455/456.3 |
| 2016/0140670 A1* | 5/2016 | Gupta | ................ | H04W 4/21 705/7.29 |
| 2016/0171589 A1* | 6/2016 | Glover | ............ | G06Q 30/0631 705/26.7 |
| 2016/0287992 A1* | 10/2016 | Knutsson | ............ | A63F 13/12 |
| 2016/0357537 A1* | 12/2016 | Falkenburg | ............ | H04L 67/06 |

FOREIGN PATENT DOCUMENTS

| | | |
|---|---|---|
| JP | 2013-004058 A | 1/2013 |
| JP | 2014-035771 A | 2/2014 |
| JP | 2014-211697 A | 11/2014 |
| JP | WO2014-049828 | 8/2016 |
| KR | 10-2009-0016119 A | 2/2009 |
| KR | 1020090016119 | 2/2009 |
| KR | 100954624 B1 | 4/2010 |
| KR | 10-2013-0071489 A | 6/2013 |
| KR | 1020130071489 | 6/2013 |
| KR | 10-2013-0128443 A | 11/2013 |

OTHER PUBLICATIONS

"Method and apparatus for quickly locate and switch between browser main window and pop-up windows" Apr. 10, 2015 (Year: 2015).*

International Search Report and the Written Opinion of the International Searching Authority for PCT/US2016/046820 dated Nov. 22, 2016, 9 pages.

International Preliminary Report on Patentability for PCT/US2016/046820 dated Mar. 1, 2018, 7 pages.

Examination Report for EPO Application No. 16754117.6 dated Aug. 8, 2018, 7 pages.

Office Action for JP Application No. 2017-551265 dated Nov. 26, 2018, 8 pages (with English translation).

Office Action for KR Application No. 10-2017-7030501 dated Oct. 8, 2018, 16 pages (with English translation).

Foreign Action other than Search Report on KR 10-2017-7030501 dated May 30, 2019.

Office Action for JP Application No. 2017-551265 dated Apr. 1, 2019, 8 pages (with English translation).

First Office Action for CN Appln. Ser. No. 201680025155.8 dated Jan. 17, 2020 (10 pages).

Decision of Rejection for KR Appln. Ser. No. 10-2017-7030501 dated Dec. 12, 2019 (8 pages).

Examination Report for EP Appln. Ser. No. 16754117.6 dated Mar. 4, 2020 (6 pages).

Examination Report for IN Appln. Ser. No. 201747034669 dated Jul. 14, 2020 (7 pages).

Notice of Reasons for Rejection for JP Appln. Ser. No. 2017-551265 dated Sep. 7, 2020 (4 pages).

* cited by examiner

DISPLAYING CONTENT ITEMS BASED ON USER'S LEVEL OF INTEREST IN OBTAINING CONTENT

BACKGROUND

The Internet enables access to a wide variety of resources. For example, video, audio, web pages directed to particular subject matter, news articles, images, and other resources are accessible over the Internet. The wide variety of resources that are accessible over the Internet has enabled opportunities for content distributors to provide content items with resources that are requested by users. Content items are units of content (e.g., individual files or a set of files) that are presented in/with resources (e.g., web pages), for example, in response to a content item request that is initiated by code included in, or associated with, the resource. An advertisement is an example of a content item that advertisers can provide for presentation at user devices.

SUMMARY

This specification describes technologies relating to data processing and content presentation.

In general, one innovative aspect of the subject matter described in this specification can be embodied in methods that include the actions of obtaining, for each of one or more first applications, a user's level of interest in obtaining content based on a number of user requests for content from the application that result in less than a given amount of content being presented to the user; selecting, based on one or more obtained levels of interest, a content item for a second application that has available content, the second application being different from the first application; and causing the content item to be displayed on a display of a user device. Other embodiments of this aspect include corresponding systems, apparatus, and computer programs, configured to perform the actions of the methods, encoded on computer storage devices.

These and other embodiments can each optionally include one or more of the following features. Some aspects include selecting the second application from a set of one or more applications that are installed on the user device and that have at least a threshold amount of unviewed content available. In some aspects, selecting the second application includes selecting the second application based at least on a bid a distributor of the application is willing to pay for presentation of the content item to the user.

In some aspects, selecting the second application from a set of one or more applications that are installed on the user device includes receiving bids for multiple applications installed on the user device, each bid specifying an amount that distributes distributor the application is willing to pay for presentation of the content item to the user; and selecting the second application from the multiple applications based on results of an auction performed on the user device using the bids. The bids can be received from the applications by way of inter-application communications. In some aspects, the bids are specific to the user.

In some implementations, determining, based on the one or more obtained levels of interest, to provide a content item for a second application that has available content includes aggregating the one or more obtained levels of interest to determine an overall level of interest and determining that the overall level of interest satisfies a threshold score. Some aspects include determining that the level of interest for a given first application caused the overall level of interest to satisfy the threshold score and, in response, providing a credit to a distributor of the given first application.

In some aspects, the level of interest for a given first application is received from the given first application, the level of interest for the given first application being based on a number of requests for content received by the given first application. In some implementations, the user's level of interest in obtaining content based on at least one of (i) a number of times a display of the user device has been turned on in a given time period, (ii) a number of times a screen of the user device has been swiped in the given time period, or (iii) a number of times a particular application has been opened in the given time period.

Particular embodiments of the subject matter described in this specification can be implemented so as to realize one or more of the following advantages. Content items can be displayed to users when the users are more interested in the content items by conditioning the display of the content items on a level of interest that the user has in viewing content. By providing content items to a user when the user is interested in viewing content items, the likelihood that the user will interact with a content item (e.g., select the content item) is increased. Providing content items to a user when the user is interested in viewing content items also reduces the risk of adverse effects, such as the user disabling notifications, uninstalling applications, or becoming desensitized to the application's content.

Latency in determining whether to present a content item and/or in selecting a content item can be reduced by making the determination and/or selection at the user device rather than at a remote server. Similarly, the amount of data transferred over a network can be reduced by making the determination and/or selection at the user device rather than at a remote server. Content items can be presented to users based on their current context without the requirement of being connected to a network. Performing a content item selection process at the user device also allows the process to work when the user device is not connected to the network, a time at which content already installed on the user's device is much more valuable to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
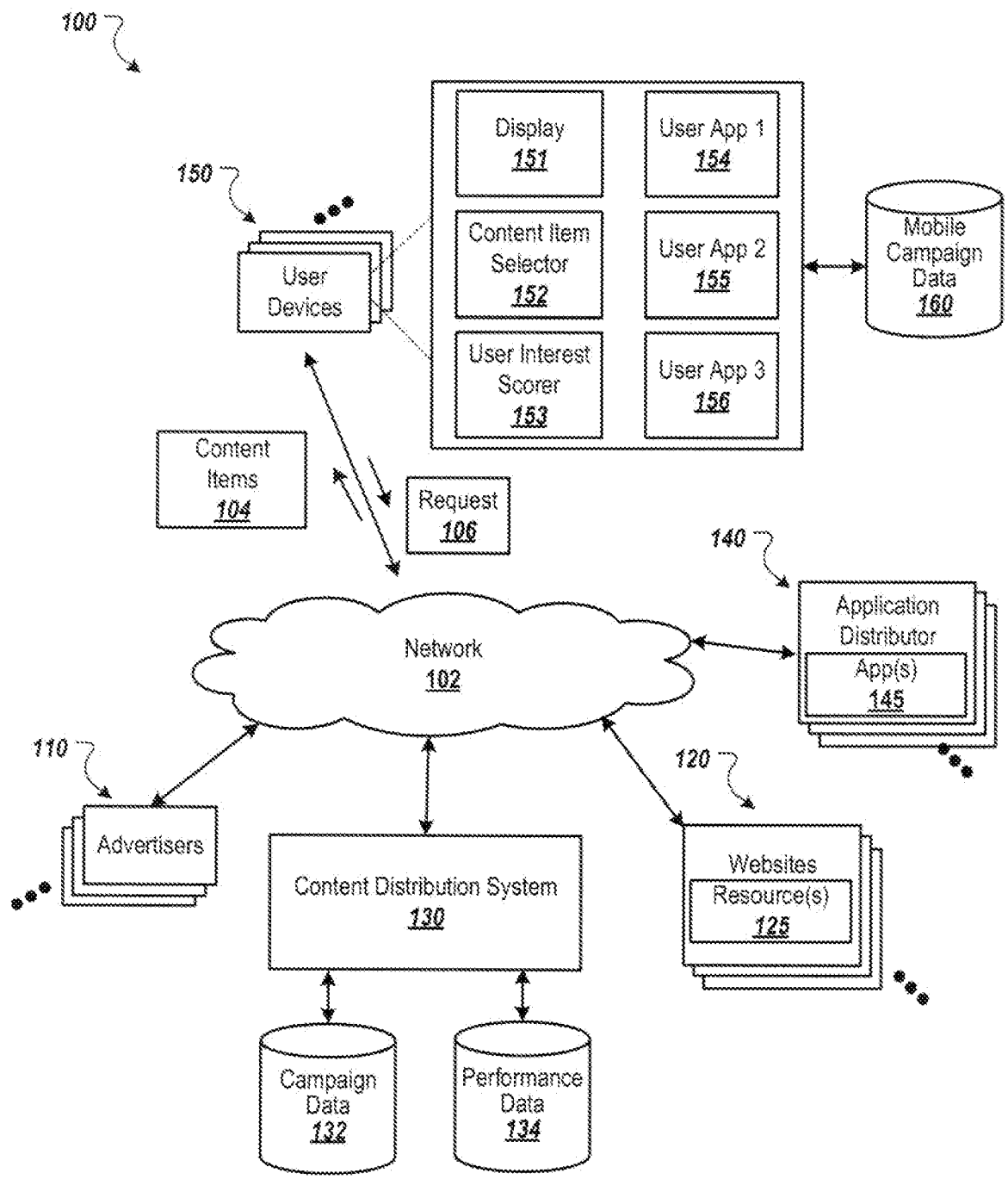
FIG. 1 is block diagram of an example environment in which a user device presents content items.

A content item can be presented to a user upon a determination that the user is interested in obtaining content, for example, from one or more native applications installed on the user's device, but that an insufficient amount of content has been provided in response to the user's content request(s). For example, a user may make multiple requests for updated social networking content in the user's news feed (e.g., through a mobile device native application). When no new content, or less than a given amount of content, is returned in response to the requests, the user's interest in content may be deemed to have not been satisfied. When a user receives less than a given amount of content, the content may be insufficient to satisfy the user's interest and the user may be receptive to content items that link to other content (e.g., content from a different native application installed on the user's mobile device) in which the user is interested.

A user's request for content may be unsuccessful when the user's device is not connected to a network (e.g., a mobile communications network or the Internet). In these situations, the user may be interested in viewing content items that link to content stored on the user's device. For example, the user may be receptive to receiving an advertisement, notification, or other appropriate content item that links to a game installed on the user's device that the user has not played in some time if an insufficient amount (e.g., less than a given amount) of requested social networking content is returned in response to one or more requests.

A user's level of interest in obtaining content may be determined or inferred based on a number of user requests for content from an application and/or an amount of content provided to the user in response to those requests. For example, the user may have a higher level of interest in obtaining content if the user has made many unsuccessful requests for content (e.g., in a given time period) than if the user has only made one unsuccessful request. As used throughout this document, an unsuccessful request refers to a request in response to which less than a given amount of content is provided. The given amount of content used to determine the user's level of interest may include only newly received content. For example, if the same content that has already been presented to a user is received again in response to a subsequent request, this same content will not be considered for purposes of determining whether the given amount of content has been provided.

In some implementations, the user's level of interest in receiving content may be based on user interactions with a user device. For example, the user's level of interests may be based on a number of times the user device's screen has been turned on or off within a given amount of time; a number of times the home screen of the user device has been swiped within a given amount of time; whether or not a swipe of the home screen extended to the end of the home screen at one or more sides of the home screen; and/or a number of times an application installed on the user device has been opened or closed within a given amount of time.

A content item may be presented to the user in response to the user's level of interest satisfying a threshold. In some implementations, multiple applications can contribute to an overall level of interest for the user. For example, if the user has requested content from multiple applications and the requests resulted in less than a given amount of content, the user's overall level of interest in receiving content may be high (e.g., high enough to satisfy a threshold for presenting a content item).

Multiple different applications installed on a user device can provide data to a given application that determines the user's level of interest based on the data. The given application can also select content items for presentation based on the user's level of interest. For example, the applications can each provide data specifying a number of requests for content initiated by the user with the application and the amount of content received in response to the requests. In addition, or in the alternative, each application can provide a level of interest for the user determined by the application. For example, each application can determine a respective level of interest for the user based on user interactions with the application (e.g., number of requests initiated by the user, an amount of content received in response to each request, and/or a number of times the application has been opened and/or closed—e.g., within a given amount of time. The individual levels of interest can then be aggregated (e.g., sum, average, or weighted average), to determine an overall level of interest for the user in obtaining content.

A content item may be presented to the user in response to the user's level of interest satisfying a threshold (e.g., by meeting or exceeding the threshold). The content item may be selected based on criteria provided by application distributors (e.g., bids and/or context-based rules) and presented with or in place of an application from which content was previously requested. When the user interacts with a content item, the user device can launch the application and present content of the application, e.g., in place of the application from which content was previously requested. In some implementations, the content item includes a link to download an application. In this example, interaction with the content item may cause the user device to download the application.

FIG. 1 is block diagram of an example environment 100 in which a user device 150 presents content items. The example environment 100 includes a network 102 such as a local area network (LAN), wide area network (WAN), the Internet, a mobile communications network, or a combination thereof. The network 102 connects websites 120, user devices 150, advertisers 110, application distributors 140, and the content distribution system 130. The example environment 100 may include many websites 120, user devices 150, advertisers 110, and application distributors 140. Although shown as separate entities, the application distributors 140 may also be advertisers 110.

A website 120 is one or more resources 125 associated with a domain name and hosted by one or more servers. An example website is a collection of web pages formatted in hypertext markup language (HTML) that can contain text, images, multimedia content, and programming elements, e.g., scripts. Each website 120 is maintained by a publisher, e.g., an entity that manages and/or owns the website 120.

A resource 125 is data provided by the website 120 over the network 102 and that is associated with a resource address. Resources include HTML pages, word processing documents, and portable document format (PDF) documents, images, video, and feed sources, to name only a few. The resources can include content, such as words, phrases, pictures, and so on, and may include embedded information (such as meta information and hyperlinks) and/or embedded instructions (such as scripts).

A user device 150 is an electronic device that is capable of requesting and receiving resources 125 and content items 104 over the network 102. Example user devices 150 include personal computers and mobile computing devices, e.g., smartphones and/or tablet computing devices, that can send and receive data over the network 102. As used throughout this document the term mobile computing device ("mobile device") refers to a user device that is configured to communicate over a wireless and/or mobile communications network. A smartphone, (i.e., a phone that is enabled to communicate over the Internet) is an example of a mobile device. User devices 150 include a display 151, such as a touchscreen, that displays content to a user.

A user device 150 typically includes a user application, e.g., a web browser, that facilitates the sending and receiving of data over the network 102. A user device 150 may also include other user applications 154-156, e.g., native applications. A used here, a "native application", which may also be referred to as an "app," is an application that runs on a user device 150 and that operates independent of a browser application on the user device 150. In particular, a native application is an application specifically designed to run on a particular user device operating system and machine firmware. Application distributors 140 may distribute applications 145 to user devices 150, e.g., in response to requests to download the applications 145.

A user device 150 can request resources 125 from a website 120. In turn, data representing the resource 125 can be provided to the user device 150 for presentation by the user device 150. The data representing the resource 125 can include resource content (e.g., text, images, videos, etc. of the resource 125) and content item slots (e.g., advertisement slots). When a resource 125 having a content item slot is requested by a user device 150, the content distribution system 130 receives a content item request 106 requesting content items to be provided with the resource content.

A content item request 106 can include data regarding the content item slots (e.g. size or type of content item slot), data regarding the resource 125 on which the content item will be presented (e.g., category or keywords found on the resource, data regarding publisher of resource, etc.), and/or other data. If the content items are to be presented in content item slots of a search results page, the content item request 106 may include keywords of a search query submitted to a search system.

The content distribution system 130 allows advertisers 110 or other content item providers to define campaign rules that take into account attributes of content item slots or resources or applications on which content items (e.g., advertisements) are to be presented. Example campaign rules include keyword rules, in which an advertiser 110 provides bids for keywords that are present in either search queries, resource content, or application content. The campaign rules can also specify particular contextual data about a user device 150 on which content items are to be presented. For example, the advertisers 110 may define location-based rules to serve content items to user devices 150 that are within particular geographic areas.

When a user of a user device 150 selects an advertisement, the user device 150 can generate a request for a landing page of the advertisement, which is may be a web page of the advertiser 110. For example, the advertisers 110 may each have respective web pages, some of which are landing pages for the advertisements of the advertisers 110. Some advertisements, and other content items, can include a link to a particular location within a resource, e.g., a web page, or to a particular location within an application. Such links are referred to as "deeplinks." In addition, some content items can include a link to download an application 145. In response to interaction with such content items, the user device 150 can initiate the download of the application from a web site of its application distributor 145 or from an application store.

The content distribution system 130 includes a data storage system that stores campaign data 132 and performance data 134. The campaign data 132 stores content items (e.g., advertisements), campaign information, bid values for content items, and budgeting information for advertisers 110. The performance data 134 stores data indicating the performance of the content items that are served. Such performance data can include, for example, click-through rates for content items, the number of impressions for content items, and the number of conversions for content items (e.g., purchase of a product in response to the display of an advertisement). Other performance data can also be stored.

The campaign data 132 and the performance data 134 can be used as input parameters to a content item auction. In particular, the content distribution system 130, in response to each request for content items, conducts an auction to select content items that are provided in response to the request. The content items are ranked according to a score that, in some implementations, is proportional to a value based on a bid and one or more parameters specified in the performance data 134. The highest ranked content items resulting from the auction are selected and provided to the requesting user device.

A user device 150 can also include a content item selector 152 and a user interest scorer 153 to facilitate the presentation of content items 106 at the user device 150. For example, the content item selector 152 can select content items for presentation at the user device 150 when the user device 150 is not in data communication with the network 102. The content item selector 152 can select content items for presentation at the user device 150 when the user device 150 is in data communication with the network 102, for example, to reduce latency in presenting a content item or to allow advertisers 110 to bid on presentation of content items to particular users without providing user data over the network 102.

The content item selector 152 may be an application installed on the user device 150 or part of an operating system of the user device 150. Similarly, the user interest scorer 153 may be an application installed on the user device 150 or part of an operating system of the user device 150. Although illustrated as separate components, the content item selector 152 and user interest scorer 153 may be implemented as a single application.

The content item selector 152 can determine whether to present a content item to a user based on the user's level of interest in obtaining content. The user interest scorer 153 can determine the user's level of interest in obtaining content based on requests for content initiated by the user using the applications 154-156, an amount of content received in response to the requests, and/or other user interactions with the user deice (e.g., opening and closing applications, swiping the home screen of the user device, and/or turning on and off the user device's display). For example, the user's level of interest in obtaining content may be based on a number of requests for content initiated by the user using one or more of the applications 154-156 installed on the user device 150. A higher number of requests can result in a higher level of interest than a low number of requests. For example, the level of interest in obtaining content may be directly proportional to the number of requests. The level of interest in obtaining content may also be inversely proportional to the amount of received content.

The user's level of interest in obtaining content may be based on a number of requests for content that results in less than a given amount of content being received. For example, when the user initiates multiple requests for content that result in the user receiving less than a given amount of content, the content provided may be insufficient to satisfy the user's interest, such that the user may be highly interested in receiving content. In this example, the user's level of interest in obtaining content may be higher than if the user received more than the given amount of content or only submitted a single request.

To illustrate, a user may be waiting for a friend to arrive at a restaurant. While waiting, the user may request updates to a social networking news feed using a social networking application (e.g., application 154). If the user makes several requests using the social networking application, but little new content (e.g., less than the given amount) is provided, the user's repeated requests for content may indicate a high level of interest in obtaining content to occupy his time while waiting for the friend to arrive. In this situation, the user may be receptive to receiving a content item that links to another application that has available content. For example, if the lack of content is due to lack of network availability, the user may be receptive to receiving a content item that links to an application installed on the user device 150 as this application may have available content without making a request over the network 102.

In another example, the user may interact with the user device 150 while waiting for the friend. For example, the user may repeatedly turn on and off the device's display checking for updates or simply fidgeting with the device. If the user has turned on and off the display a given number of times within a given amount of time, the user may be receptive to receiving a content item. Similarly, if the user has swiped the home screen a given number of times and/or opened and closed an application a given number of times within a specified amount of time, the user may be interested in receiving a content item.

The user interest scorer 153 may obtain data from the applications 154-156 and/or from the user device's operating system and determine the user's level of interest in obtaining content based on the received data. For example, the user interest scorer 153 may aggregate the data and determine the user's level of interest based on the aggregated data. The aggregated data can include, for each application, a number of requests for content submitted using the application, an amount of content received in response to each request, a number of request submitted using the application that resulted in less than a given amount of content being received, and/or a number of times the application has been opened and/or closed in a given amount of time. The aggregated data can also include a number of times the device's display has been turned on and off in a given amount of time and/or a number of times the device's home screen has been swiped in a given amount of time. The content item selector 152 can then determine whether to present a content item based on the determined level of interest.

In some implementations, the user interest scorer 153 obtains, for a user, a level of interest in obtaining content from one or more applications installed on the user device 150. For example, each application 154-156 may determine a level of interest for the user based on requests for content initiated by the user using the application, an amount of content provided to the user in response to the requests, and/or a number of times the application has been opened or closed in a given amount of time. The user interest scorer 153 can determine an overall level of interest for the user based on the level of interest received from each application 154-156. For example, the user interest scorer 153 may determine a sum, average, weighted average, or another appropriate combination of the individual levels of interest.

In some implementations, the user interest scorer 153 determines the user's level of interest based on request data received from the applications 152-156. For example, the request data received from each application 152-156 may specify a number of requests initiated by the user, the amount of content provided to the user in response to the requests, and the time at which the requests were made. The user interest scorer 153 can determine the user's level of interest in obtaining content based on a combination of the received data from each of the applications. For example, the user interest scorer 153 may determine an overall level of interest based on the combined number of requests, the combined amount of data provided to the user in response to the requests, and the times at which the requests were initiated. In another example, the user interest scorer 153 may identify, from the request data, those requests that resulted in less than a given amount of content being provided to the user and determine the overall level of interest based on the identified requests. For example, a higher number of identified requests may result in a higher level of interest than a lower number of identified requests.

The user interest scorer 153 may detect requests for content and content received in response to the requests and use the detected data to determine the user's level of interest in obtaining content. For example, the user interest scorer 153 may monitor content displayed on the display 151. By monitoring the content, the user interest scorer 153 can detect when the user has made particular gestures (e.g., swipes on touch screens) or other inputs to request content. Similarly, the user interest scorer 153 can obtain screenshots of the display 151 before and after such requests. The user interest scorer 153 can compare the screenshots and determine how much new content was received based on the difference. For example, if the screenshots are exactly the same, the user interest scorer 153 may determine that no new content was received. In contrast, if 80% (or some other specified amount) of the screenshots are different, the user interest scorer 153 may determine that a substantial amount (e.g., more than a given amount) of new content was received. The user interest scorer 153 can determine the user's level of interest in obtaining content based on the number of requests detected, the amount of content received in response to the requests, and/or an amount of time that has passed since each request was received. For example, the impact on the user's level of interest by a particular request for content may decrease over time.

The user interest scorer 153 provides the determined or obtained user's level of interest (individual or overall) to the content item selector 152. The content item selector 152 can determine whether to present a content item based on the user's level of interest. For example, the content item selector 152 may compare the user's level of interest to a specified threshold. If the user's level of interest satisfies the threshold, e.g., by meeting or exceeding the threshold, the content item selector 152 may determine to present a content item.

Rather than present content items in response to content item requests (e.g., ad requests) or based on a schedule (e.g., between two portions of content), the content item selector 152 can present content items when the user's level of interest in obtaining content satisfies a threshold. For example, the content item selector 152 and user interest scorer 153 can monitor (e.g., continuously or periodically) the user's level of interest and provide a content item to the user when it is determined that the user's level of interest is sufficient to satisfy the threshold.

The content item selector 152 can select one or more content items to present from, and using, mobile campaign data 160. The mobile campaign data 160 can be received from advertisers 110, including application distributors 140, and can be stored on the user device 150. In this way, the content item selector 152 can access the mobile campaign data 160 when the user device 150 is not connected to the network 102.

The mobile campaign data 160 for an advertiser 110 includes one or more content items for presentation on the user device 150, campaign rules that condition the eligibility of content items to be presented, and/or one or more bids for the content item. The campaign rules can include context-based rules that condition the eligibility of content items using user context data. Example campaign rules include location-based rules that specify in what user device locations the contents items of the advertiser 110 are eligible to be presented. The location-based rules can specify geographical areas, e.g., Atlanta, or user-based locations, e.g., home, work, away, or out of town. For example, a mobile game distributor may specify that content items that link to the game are eligible to be presented when the user is at home or away, but not while the user is at work.

Another example of a campaign rule takes into account calendar entries of the user, e.g., in a calendar application installed on the user device 150. Such campaign rules can take into account the time and duration of events on the calendar, and/or the amount of time until the event is scheduled to occur. An example campaign rule may specify that a content item for a particular application is not eligible for presentation if the user has less than a particular amount of time before a next event on the user's calendar. For example, the application distributor may specify that a content item for a book is not eligible for presentation if the user has less than ten minutes between a current time and the time of a next event on the user's calendar.

In some implementations, the content item selector 153 may select content items based on the duration of events on the calendar and/or the amount of time until the event is scheduled to occur, e.g., independent of campaign rules. For example, if the user has a particular amount of time before a next event on the user's calendar, the content item selector 152 may select a content item for an application that the user typically uses for less than the particular amount of time. For example, the content item selector 152 may receive data from each application that specifies an average amount of time that the user interacts with an application in each session (e.g., from opening of an application to closing of the application). In this example, the user may play game A for an average of ten minutes and game B for an average of thirty minutes. If the user has twenty minutes between a current time and the time of a next event on the user's calendar, the content item selector 152 may select a content item for game A rather than game B as the user plays game B on average for more than twenty minutes.

In some implementations, the content item selector 152 filters from eligible content items those that link to applications with which the user interacts for more than an amount of time between a current time and a time of a next event on the user's calendar. Continuing the previous game application example, content items for game A may be eligible for presentation to the user as the twenty minutes the user has until the next event is greater than the ten minutes for which user plays game A on average. Similarly, content items for game B may be ineligible for presentation to the user as the twenty minutes the user has until the next event is less than the thirty minutes for which user plays game A on average Another example campaign rule takes into account network connectivity. For example, a book application developer may specify that content items for books that have not been downloaded to the user device 150 are only eligible for presentation when the user device 150 is connected to the network 102. The book application developer may also specify that content items for books that have been downloaded to the user device, or that have unread content, are eligible for presentation when the user device 150 is not connected to the network 102.

The bid for a content item specifies an amount an advertiser 110 is willing to pay for presentation of the content item at the user device 150. The bid for a content item can vary based on contextual data. For example, an advertiser 110 may specify a first bid for presenting a content item when the user is at home and a second bid that is different from the first bid when the user is at the office. In another example, an advertiser 110 may specify a first bid for situations in which the user has a first amount of time before a next event on the user's calendar and a second bid for situations in which the user has a second amount of time before a next event on the user's calendar. Each campaign rule, or set of campaign rules, can have a corresponding bid for a particular content item. For example, a content item can have multiple bids, each with a different set of one or more campaign rules. In a particular example, a content item for a game may have a higher bid for situations in which the user has an hour before a next event and is at home and a lower bid for situations in which the user has less than ten minutes before a next event and is at work. The bid for a content item can be zero, for example, if the advertiser is unwilling to pay for presentation of the content item.

In some implementations, the content item selector 152 can reject a bid for a content item and preclude the content item from being included in a content item auction. For example, the content item selector 152 may reject a bid for a content item if the advertiser does not have sufficient credit or if the advertiser's budget has been exhausted. As described above, the campaign data 132 maintained by the content distribution system 130 can include budgeting information for advertisers 110. The content item selector 152 can receive budgeting information from the content item distributor 130, e.g., periodically when the user device 150 is connected to the network 102. When an application attempts to submit a bid for a content item auction, the content item selector 152 can evaluate the budget of the application distributor that distributes the application to determine whether to accept or reject the bid.

The bid, campaign rules, performance data (e.g., click through rates), and/or relevancy measures (e.g., relevancy of content item to user's current context) can be used as input parameters to a content item auction. The content item selector 152 can conduct an auction in response to determining that the user's interest in obtaining content satisfies a specified threshold. The auction can include the content items that are eligible to be provided based on the campaign rules. The content items that are eligible for presentation are ranked according to a respective score that is based on the input parameters. For example, the score for a content item can be based on a bid for the content item, the relevancy of the application linked to by the application to the user's current context (e.g., location, time until next event, etc.), and/or performance data for the content item (e.g., click through rate of the content item). For a content item that includes multiple bids based on context, the bid that includes campaign rules that match the user's context at the time of the auction may be used in the auction for the content item. One or more of the highest ranked content items can be selected and presented by the user device 150. After the auction is conducted, the content item selector 152 can report the results of the auction to the content distribution system 130.

In some implementations, the auction includes only those content items that link to applications that have at least a given amount of unviewed content. Unviewed content is content that has not yet been presented to the user at the user device 150. Unviewed content can include unread chapters of an e-book, uncompleted levels of a game, unread social networking posts or messages, and unviewed pictures or videos, to name just a few examples. For example, a user may be more interested in receiving a content item that links to an e-book that the user has only partially read rather than an e-book that the user has completely read.

Application distributors 140 can provide mobile campaign data, e.g., including bids for a content item auction, to the user device 150 by way of an application 154-156 installed on, or executing on, the user device 150. In turn the application 154-156 can provide the mobile campaign data to the content item selector 152, which stores the mobile campaign data 160 on the user device 150. For example, the applications can communicate with the content item selector using an application sharing protocol.

Some mobile device operating systems allow applications to communicate with each other, submit commands to other applications, share data between each other, and/or launch another application. For example, the mobile device operating systems typically include a communication protocol that enable inter-application communications. This allows, for example, an application distributor 140 that wants a map of a particular location to be presented to a user in response to input from a user can create a request that is sent to a map application to present the map rather than including the map functionality in the application. Application distributors 140 that want to have content items presented to users can similarly create a request to send mobile campaign data to the content item selector 152. For example, the application distributor 140 can configure the application 145 to send mobile campaign data, including bids, to the content item selector 152 using the communication protocol of the mobile operating system. The application distributor 140 can then send mobile campaign data to the application installed on the user device 150. In turn, the application can send the mobile campaign data to the content item selector 152 using the mobile operating system's communication protocol.

In some implementations, application distributors 140 can provide bids based on the user of the user device 150. For example, the application distributor 140 may have data regarding the user's past interactions with an application and/or data that the user provided to the application distributor 140 before downloading the application or when signing up to use the application. As the auction, or other content item selection process, occurs on the user device 150, the bids can be user specific rather than for a class of people.

Figure 2:
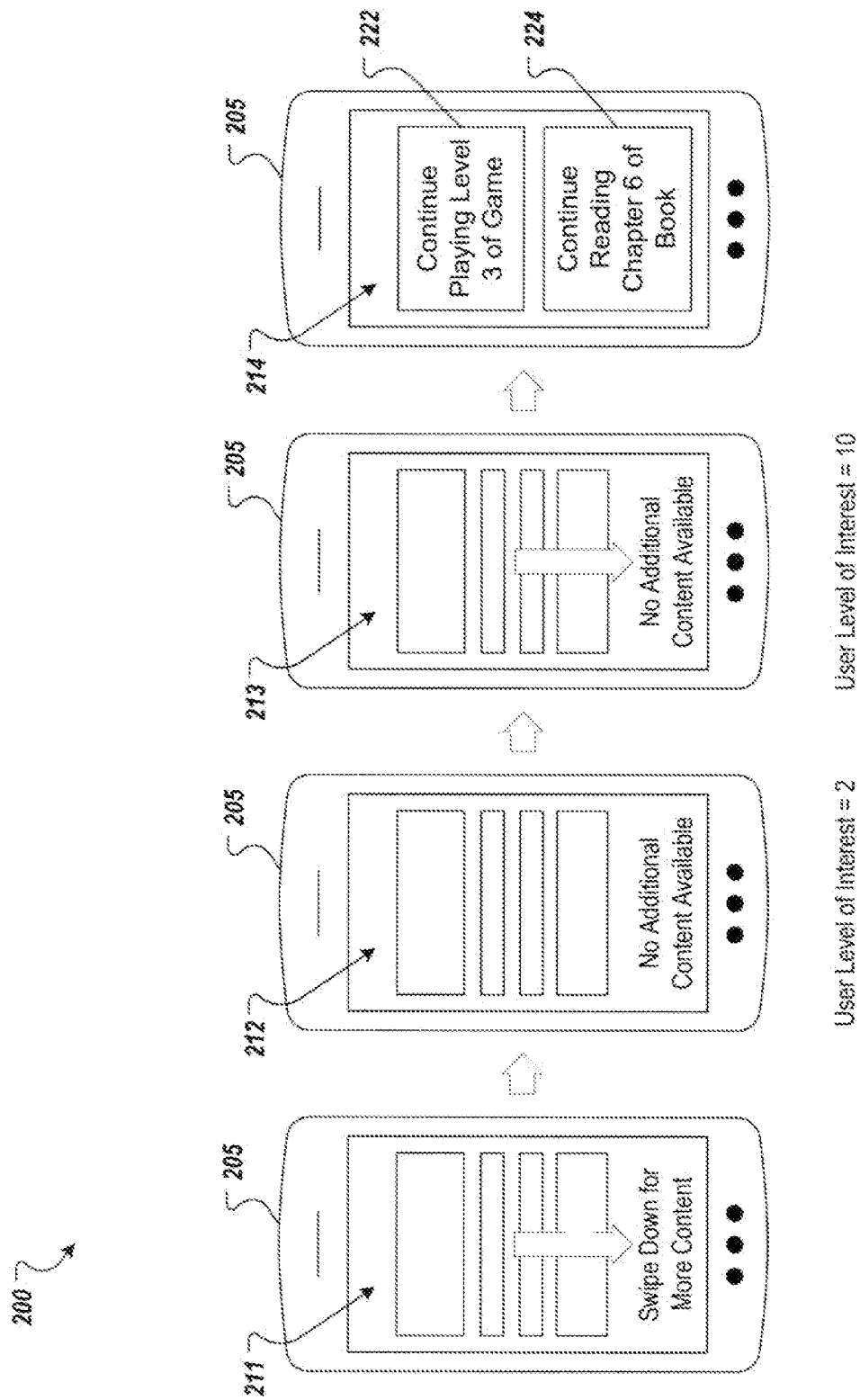
FIG. 2 is a block diagram of a sequence of example screen shots of a mobile phone that illustrate requests for content and presentation of content items.

FIG. 2 is a block diagram of a sequence 200 of example screen shots 211-214 of a mobile phone 205 that illustrate requests for content and presentation of content items. In screen shot 211, the mobile phone 205 is displaying a news feed of a social networking application installed on the mobile phone 205. The social networking application also includes text that instructs the user to swipe downwards on the mobile phone's touch screen to request additional content. In response to the user swiping downwards, the social networking application submits, to a server of the social networking application's distributor, a request for additional content from the server.

In this example, the request results in no additional content being received at the mobile phone 205 for the user's news feed, as shown in screen shot 212. A level of interest in the user obtaining content can be determined based on the request and the lack of content received in response to the request. For example, the social networking application or the user interest scorer 153 of FIG. 1 may determine that the user has a level of interest of 2 based on the request and lack of content. The content item selector 152 can compare the level of interest to a specified threshold to determine whether to present a content item on the mobile phone 205. In this example, assume the threshold is 5 resulting in no content item being presented.

In screen shot 213, the user initiates another request for content by swiping downwards on the touch screen. An updated level of interest in obtaining content can be determined in response to this second request. The updated level of interest can be based on the number of requests (e.g., 2), the amount of content returned in each request, and the amount of time elapsed for each previous request for content, as described in more detail below with reference to FIG. 3. In this example, the updated level of interest is determined to have a value of 10.

The content item selector 152 can compare the updated level of interest to the specified threshold. As the updated level of interest exceeds the specified threshold of 5, one or more content items can be presented. For example, screen shot 214 includes two content items 222 and 224 that are presented to the user. The content items 222 and 224 can be presented while the social networking application is presented. For example, the content items 222 and 224 may be presented with the social networking application, e.g., in content item slots of the social networking application, or over content of the social networking application, e.g., in an overlay or pop-up.

The example content items 222 and 224 can link to applications installed on the mobile phone 205. For example, the content item 222 can link to a particular location in level 3 of a game of a game application installed on the mobile phone 205. Similarly, the content item 224 can link to a particular location in chapter 6 of an e-book provided by a book reading application. In this example, user interaction with the content item 222 (e.g., a selection of the content item 222) may cause the mobile phone 205 to launch the game application at level 3. Similarly, user interaction with the content item 224 may cause the mobile phone 205 to launch the book reading application and present chapter 6 of the e-book.

The game application and the book reading application can be different from the social networking application. For example, the game application and the book reading application can each be provided by a respective application distributor that is different from an application distributor that distributes the social networking application.

Figure 3:
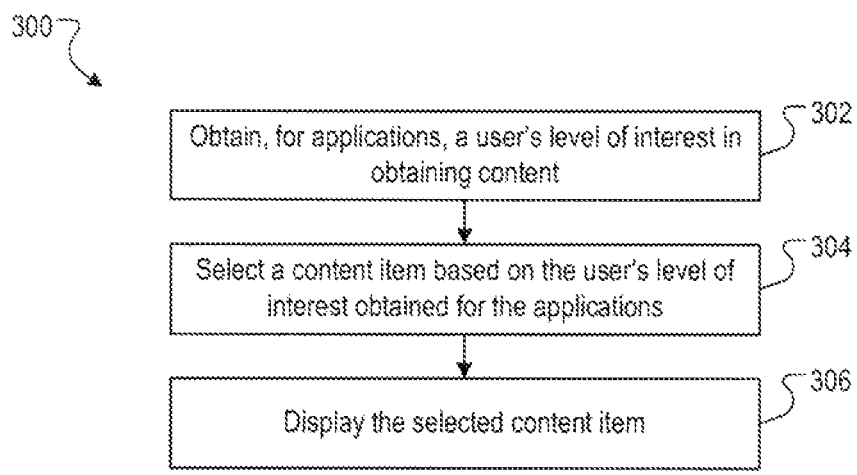
FIG. 3 is a flow chart of an example process for selecting and displaying a content item.

FIG. 3 is a flow chart of an example process 300 for selecting and displaying a content item. Operations of the process 300 can be implemented, for example, by a data processing apparatus, such as the user device 150 of FIG. 1. The process 300 can also be implemented by instructions stored on computer storage medium, where execution of the instructions by a data processing apparatus cause the data processing apparatus to perform the operations of the process 300.

A user's level of interest for obtaining content is obtained for one or more applications (302). For example, a content item selector, e.g., the content item selector 152 of FIG. 1, can obtain a user's level of interest from the application(s) or from a user interest scorer, e.g., the user interest scorer 153 of FIG. 1.

As described above, the user's level of interest in obtaining content can be based on a number of requests for content initiated by the user with respect to one or more applications, an amount of content received in response to the requests, an amount of time since each request was initiated, a number of times the display of a user device has been turned on or off, a number of swipes across a home screen of the user device, and/or a number of times each of one or more applications have been opened or closed. For example, more requests may result in a higher level of interest than fewer requests. Similarly, less content received in response to the requests may result in a higher level of interest than more received content. In addition, a greater number of swipes, activations of a display, and opening of an application may result in a higher level of interest than less swipes, activations, and openings.

The requests and received content used to determine the user's level of interest may be those that occur during a particular time period, e.g., a time period that ends just before the level of interest is determined and that lasts for a particular duration. In addition, the impact of requests and their respective amounts of received content on the user's level of interest may decrease over time. For example, the impact of each request may be weighted based on the amount of time since the request was initiated. Similarly, the impact of turning on/off the user device, swiping the home screen, and or opening/closing an application may be weighted based on the amount of time since the action occurred.

In some implementations, the user's level of interest is based on the number of requests for content that result in less than a given amount of content being received. For example, if the user initiates ten requests, from one or more applications, and nine result in less than the given amount of content being received, the user's interest in obtaining content may be higher than if the user initiated ten requests and five results in less than the given amount of content being received. The given amount of content can vary based on the application at which the request was initiated.

As described above, a user's level of interest in obtaining content can be determined for each application for which a user has requested content. For example, a user may first attempt to obtain updated social networking content on his news feed. If that is unsuccessful, the user may request new sports news on a sports application. If less than a given amount of new sports news is returned, the two events combine to indicate that the user is likely highly interested in obtaining content.

The individual levels of interest of each application can be combined to determine an overall level of interest in obtaining content for the user. For example, the overall level of interest can be based on a sum, average, or weighted average of the individual levels of interest.

The overall level of interest in obtaining content can also be based on other appropriate factors. If the user provides or grants access to such data, certain contextual data can be used to determine the user's level of interest in obtaining content. For example, data indicating whether the user device of the user is moving and its velocity can be used to determine the user's level of interest in obtaining content. If the velocity of the user device is greater than that of a car, indicating that the user is on a plane, the user may be more interested in obtaining content. In another example, data indicating whether the user is with (e.g., within a specified distance from) contacts or social networking friends of the user can be used to determine the user's level of interest in obtaining content. This contextual data can be combined with data regarding requests for content and the amount of content received in response to the requests to determine the user's overall level of interest in obtaining content.

In some implementations, the user can directly express an interest in receiving content. For example, the user device 150 may display a selectable icon that, when selected, initiates a request for a content item that links to content.

A content item is selected based on the user's level of interest in obtaining content (304). For example, the content item selector may compare the user's level of interest in obtaining content to a specified threshold. If the user's level of interest satisfies the threshold, the content item selector may determine to provide a content item. If the user's level of interest does not satisfy the specified threshold, the content item selector may determine to not provide a content item.

As described above, to select a content item, the content item selector may conduct an auction based on mobile campaign data (e.g., bids and campaign rules) provided by content item providers, such as application distributors. The content items that are eligible for presentation are ranked according to a respective score that is based on the input parameters. One or more of the highest ranked content items are selected for presentation.

In some implementations, the auction includes each of the the content items that are eligible to be provided based on the campaign rules. In some implementations, the auction includes only those content items that link to applications that have at least a given amount of unviewed content.

The selected content item(s) are presented at the user device (306). For example, the content item selector can cause the user device to present the selected content item(s) on the device's display. When the user interacts with a content item, the user device can launch an application linked to by the content item and present content of the application to the user.

Figure 4:
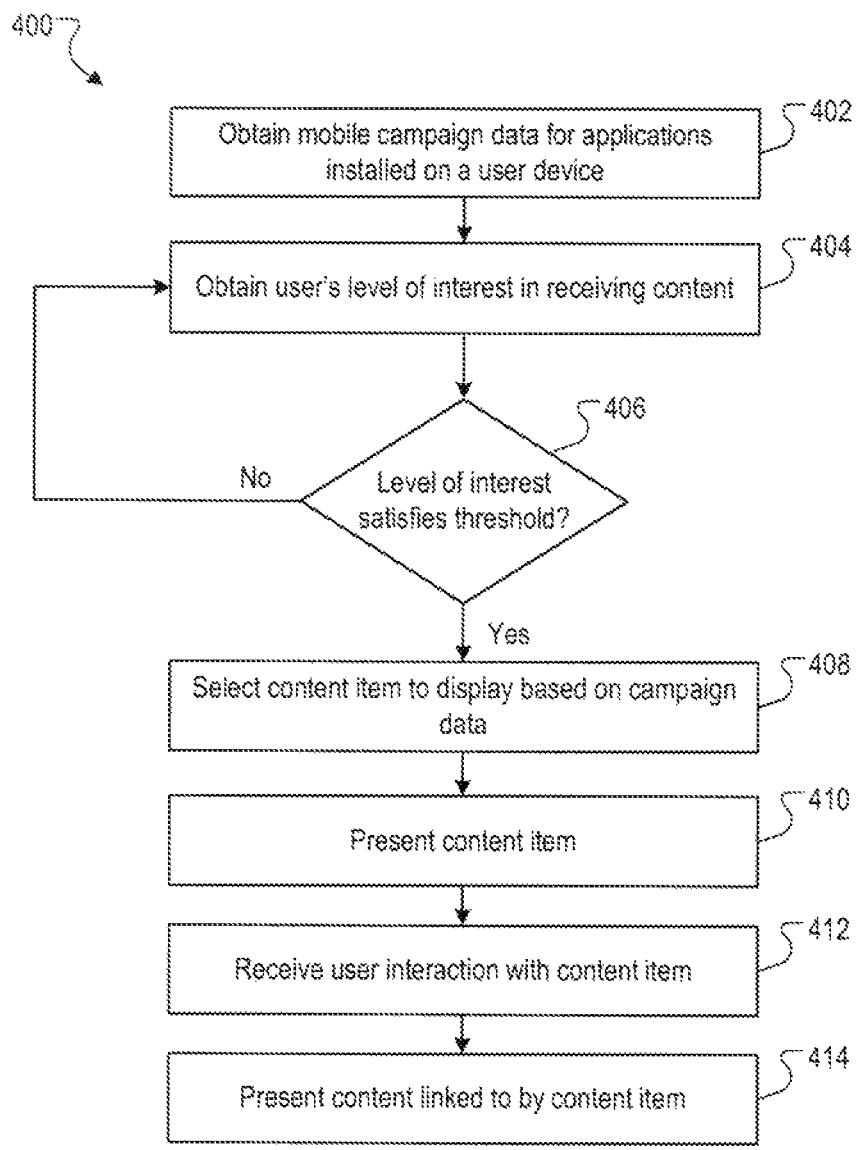
FIG. 4 is a flow chart of another example process for selecting and displaying a content item.

FIG. 4 is a flow chart of an example process 400 for selecting and presenting a content item. Operations of the process 400 can be implements, for example, by a data processing apparatus, such as the user device 150 of FIG. 1. The process 400 can also be implemented by instructions stored on computer storage medium, where execution of the instructions by a data processing apparatus cause the data processing apparatus to perform the operations of the process 400.

Mobile campaign data is received for applications installed on a user device (402). For example, an application distributor may send mobile campaign data to its application installed on the user device. The application can provide the mobile campaign data to a content item selector (e.g., the content item selector 152 of FIG. 1) that stores the mobile campaign data on the user device for use in selecting content items for presentation. As described above, the mobile campaign data for a content item can include one or more bids and one or more campaign rules.

A user's level of interest in obtaining content is obtained (404). For example, the content item selector can receive the user's level of interest in receiving content from a user interest scorer, e.g., the user interest scorer 153 of FIG. 1. As described above, the user interest scorer can receive, from one or more applications, data specifying a number of requests for content initiated by a user, the amount of content received by the user device in response to the requests, a time at which each request was submitted, and/or an number of times that the application was opened or closed in a given time period. The user interest scorer can also receive data specifying user interactions with the user device, e.g., the number of times the device's display was turned on or off in a given time period and/or the number of swipes across the home screen in a given time period. The user interest scorer can determine the user's level of interest in receiving content based on the received data. In some implementations, the user interest scorer received an individual level of interest from each of the one or more applications and aggregates the individual levels of interest to determine an overall level of interest for the user.

The user interest scorer may determine the user's level of interest in obtaining content in response to each request for content initiated by the user and/or each user interaction with the user device. For example, each application may be configured to provide updated data (e.g., data regarding requests and content received in response to the requests or data specifying a level of interest) in response to the user requesting content. The user interest scorer may update (e.g., adjust) the user's level of interest in response to receiving the data.

The user's level of interest in obtaining content is compared to a specified threshold (406). If the user's level of interest does not satisfy the threshold, the content item selector does not present a content item. Instead, the content item selector waits for, or requests, an updated level of interest. For example, the content item selector may wait for an updated level of interest to be received from the user interest scorer in response to another request for content. Once an updated level of interest is received, the content item selector compares the updated level of interest to the specified threshold.

If the user's level of interest, or an updated level of interest, satisfies the threshold, e.g., by meeting or exceeding the threshold, a content item is selected (408). As described above, the content item may be selected based on mobile campaign data, for example, using a content item auction.

The selected content item is presented on the user device (410). For example, the user device may present the selected content item with an application that the user device is currently presenting. In a particular example, the user device may present the selected content item with an application from which a most recent user request for content was received. Consider, for example, that the user most recently requested social networking content from a social networking application and that less than a given amount of content was returned to the user device in response to the request. In response, the user interest scorer may update the user's level of interest in obtaining content to a value that satisfies the threshold. In response, the content item selector may select and provide a content item with the social networking application. For example, the content item may be presented in a content item slot of the social networking application or in an overlay or popup over content of the social networking application.

User interaction with the selected content item is received (412). For example, a specified user interaction (e.g., selection or tap) of the content item may be received at the content item.

Content linked to by the content item is presented (414). For example, the user interaction with the content item may cause the user device to launch an application linked to by the content item and present content of the application. The user device may also close or minimize the application with which the content item was presented in response to the user interaction. If the content item linked to a particular location within the application, the user device presents content at that particular location. For example, if the content item linked to a particular level of a game, the game may be launched and initiated at that level. In another example, if the content item includes a link to download the application the user device may initiate the download of the application in response to user interaction with the content item.

In some implementations, an application distributor receives a credit or reward if the distributor's application triggers the presentation of a content item. For example, an advertiser typically pays an amount based on its bid or the bid of another advertiser in response to the advertiser's content item being presented. A portion of the paid amount may be provided to the application distributor based on the distributor's application triggering the content item presentation. Other non-monetary credits can also be provided, such as free or discounted content item impressions.

The distributor's application can trigger the presentation of the content item if its level of interest, requests for content initiated using the application, or opening/closing of the application caused the user's overall level of interest to satisfy the threshold. For example, assume the user's current overall level of interest is three and the threshold is five. If the user requests content using a particular application and that results in less than a given amount of content being received, this event may cause the overall level of interest to increase to a value, e.g., six, that exceeds the threshold. In response, a content item may be presented and the distributor of the particular application may be credited.

Figure 5:
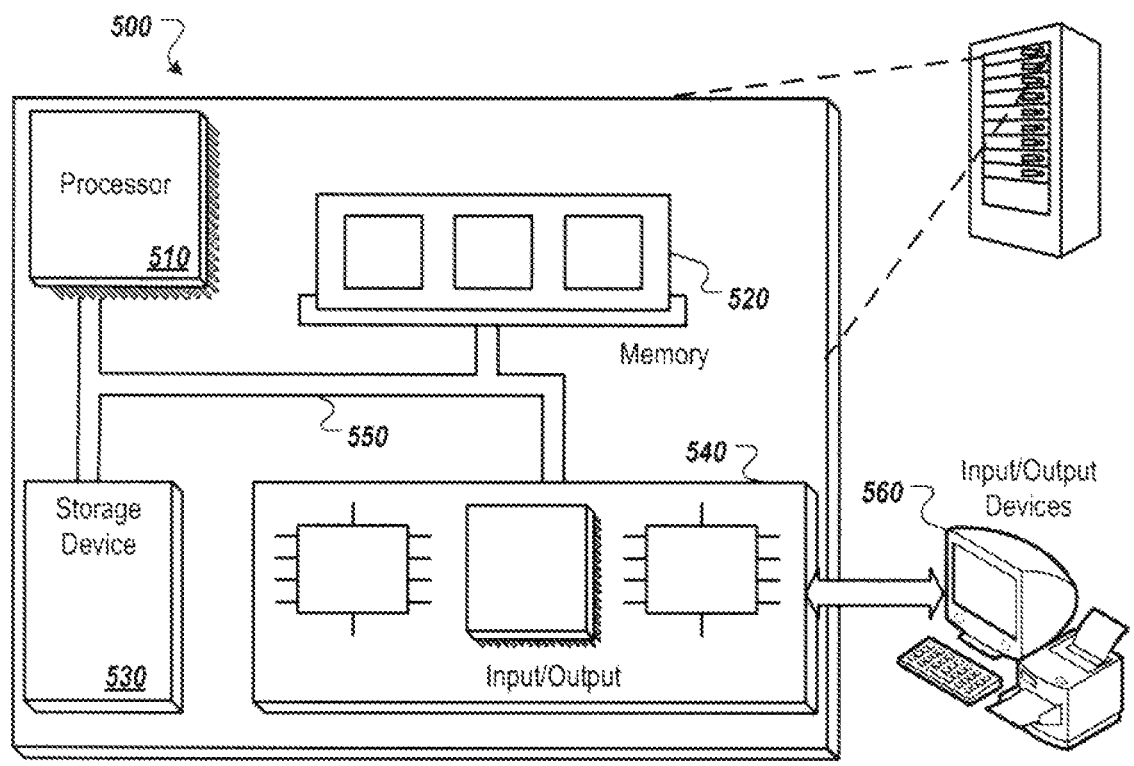
FIG. 5 is block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more processors of a user device, the method comprising:
   receiving, using a graphical user interface of a first application of a plurality of applications installed on the user device, a first interaction indicating a first request for first new content from the first application;
   transmitting, responsive to the first interaction, the first request for the first new content to a content server;
   receiving, subsequent to the first interaction and in response to the transmission of the first request, a first response from the content server that includes a first amount of content;
   determining, using the first response, that the first amount of content received from the content server is less than a predetermined amount of content;
   incrementing a count responsive to determining that the first amount of content is less than the predetermined amount of content;
   receiving, using the graphical user interface of the first application, a second interaction indicating a second request for second new content from the first application;
   transmitting, responsive to the second interaction, the second request for the second new content to the content server;
   receiving, subsequent to the second interaction and in response to the transmission of the second request, a second response from the content server that includes a second amount of content;
   determining, using the second response, that the second amount of content received from the content server is less than the predetermined amount of content;
   incrementing the count responsive to determining that the second amount of content is less than the predetermined amount of content;
   determining that the count satisfies a threshold within a session of the first application or a period of time;
   identifying, responsive to determining that the count satisfies the threshold, a second application of the plurality of applications installed on the user device, different than the first application;
   providing a link to the second application installed on the user device;
   receiving, using the graphical user interface of the first application, a third interaction with the provided link; and
   launching, the second application, responsive to receipt of the third interaction with the provided link.

2. The method of claim 1, further comprising identifying the second application from the plurality of applications installed on the user device and that have at least a threshold amount of unviewed content available.

3. The method of claim 2, wherein identifying the second application comprises identifying the second application based at least on a bid a distributor of the application is willing to pay for presentation of the content item to the user.

4. The method of claim 2, wherein identifying the second application from the plurality of applications installed on the user device comprises:
   receiving bids for multiple applications installed on the user device, each bid specifying an amount that a respective distributor of the application is willing to pay for presentation of the content item to the user; and
   identifying the second application from the multiple applications based on results of an auction performed on the user device using the bids,
   wherein the bids are received from the applications by way of inter-application communications.

5. The method of claim 4, wherein the bids are specific to the user.

6. The method of claim 1, wherein determining that the count satisfies the threshold further comprises:

aggregating one or more instances of a plurality of received interactions in a given time period to determine an overall number of the received interactions; and determining that the overall number of the received interactions satisfies a threshold score.

7. The method of claim 6, further comprising determining that the count in the given time period or within the session of the first application satisfies the threshold and, in response, providing a credit to a distributor of the first application.

8. The method of claim 1, wherein the first interaction and the second interaction are one of (i) a display of a user device has been turned on in a given time period, (ii) a screen of the user device has been swiped in the given time period, or (iii) a particular application has been opened in the given time period.

9. A system, comprising:
one or more processors of a user device; and
a memory storage apparatus in data communication with the one or more processors of the user device, the memory storage apparatus storing instructions executable by the one or more processors of the user device and that upon such execution cause the one or more processors of the user device to perform operations comprising:
receiving, using a graphical user interface of a first application of a plurality of applications installed on the user device, a first interaction indicating a first request for first new content from the first application;
transmitting, responsive to the first interaction, the first request for the first new content to a content server;
receiving, subsequent to the first interaction and in response to the transmission of the first request, a first response from the content server that includes a first amount of content;
determining, using the first response, that the first amount of content received from the content server is less than a predetermined amount of content;
incrementing a count responsive to determining that the first amount of content is less than the predetermined amount of content;
receiving, using the graphical user interface of the first application, a second interaction indicating a second request for second new content from the first application;
transmitting, responsive to the second interaction, the second request for the second new content to the content server;
receiving, subsequent to the second interaction and in response to the transmission of the second request, a second response from the content server that includes a second amount of content;
determining, using the second response, that the second amount of content received from the content server is less than the predetermined amount of content;
incrementing the count responsive to determining that the second amount of content is less than the predetermined amount of content;
determining that the count satisfies a threshold within a session of the first application or a period of time;
identifying, responsive to determining that the count satisfies the threshold, a second application of the plurality of applications installed on the user device, different than the first application;
providing a link to the second application installed on the user device;
receiving, using the graphical user interface of the first application, a third interaction with the provided link; and
launching, the second application, responsive to receipt of the third interaction with the provided link.

10. The system of claim 9, wherein the operations further comprise identifying the second application from the plurality of applications installed on the user device and that have at least a threshold amount of unviewed content available.

11. The system of claim 10, wherein identifying the second application comprises identifying the second application based at least on a bid a distributor of the application is willing to pay for presentation of the content item to the user.

12. The system of claim 10, wherein identifying the second application from the plurality of applications installed on the user device comprises:
receiving bids for multiple applications installed on the user device, each bid specifying an amount that a respective distributor of the application is willing to pay for presentation of the content item to the user; and
identifying the second application from the multiple applications based on results of an auction performed on the user device using the bids,
wherein the bids are received from the applications by way of inter-application communications.

13. The system of claim 12, wherein the bids are specific to the user.

14. The system of claim 9, wherein determining that the count satisfies the threshold further comprises:
aggregating one or more instances of a plurality of received interactions in a given time period to determine an overall number of the received interactions; and determining that the overall number of the received interactions satisfies a threshold score.

15. The system of claim 14, the operations further comprising determining that the count in the given time period or within the session of the first application satisfies the threshold and, in response, providing a credit to a distributor of the first application.

16. The system of claim 9, wherein the first interaction and the second interaction are one of (i) a display of a user device has been turned on in a given time period, (ii) a screen of the user device has been swiped in the given time period, or (iii) a particular application has been opened in the given time period.

17. A non-transitory computer storage medium encoded with a computer program, the program comprising instructions that when executed by one or more processors of a user device cause the one or more processors of a user device to perform operations comprising:
receiving, using a graphical user interface of a first application of a plurality of applications installed on the user device, a first interaction indicating a first request for first new content from the first application;
transmitting, responsive to the first interaction, the first request for the first new content to a content server;
receiving, subsequent to the first interaction and in response to the transmission of the first request, a first response from the content server that includes a first amount of content;
determining, using the first response, that the first amount of content received from the content server is less than a predetermined amount of content;

incrementing a count responsive to determining that the first amount of content is less than the predetermined amount of content;

receiving, using the graphical user interface of the first application, a second interaction indicating a second request for second new content from the first application;

transmitting, responsive to the second interaction, the second request for the second new content to the content server;

receiving, subsequent to the second interaction and in response to the transmission of the second request, a second response from the content server that includes a second amount of content;

determining, using the second response, that the second amount of content received from the content server is less than the predetermined amount of content;

incrementing the count responsive to determining that the second amount of content is less than the predetermined amount of content;

determining that the count satisfies a threshold within a session of the first application or a period of time;

identifying, responsive to determining that the count satisfies the threshold, a second application of the plurality of applications installed on the user device, different than the first application;

providing a link to the second application installed on the user device;

receiving, using the graphical user interface of the first application, a third interaction with the provided link; and launching, the second application, responsive to receipt of the third interaction with the provided link.

18. The non-transitory computer storage medium of claim 17, wherein the operations further comprise identifying the second application from the plurality of applications installed on the user device and that have at least a threshold amount of unviewed content available.

\* \* \* \* \*